US008819541B2

(12) United States Patent
Nicholas et al.

(10) Patent No.: US 8,819,541 B2
(45) Date of Patent: Aug. 26, 2014

(54) SYSTEM AND METHOD FOR CONVERTING THE DIGITAL TYPESETTING DOCUMENTS USED IN PUBLISHING TO A DEVICE-SPECFIC FORMAT FOR ELECTRONIC PUBLISHING

(75) Inventors: Christopher D Nicholas, Tucson, AZ (US); Edward John Maher, II, Tucson, AZ (US); Kristen L Ashley, Tucson, AZ (US); Lee H Berendt, Tucson, AZ (US)

(73) Assignee: Language Technologies, Inc., Tucson, AZ (US)

( * ) Notice: Subject to any disclaimer, the term of this patent is extended or adjusted under 35 U.S.C. 154(b) by 1184 days.

(21) Appl. No.: 12/697,946

(22) Filed: Feb. 1, 2010

(65) Prior Publication Data

US 2010/0211866 A1   Aug. 19, 2010

Related U.S. Application Data

(60) Provisional application No. 61/152,358, filed on Feb. 13, 2009.

(51) Int. Cl.
*G06F 17/00* (2006.01)

(52) U.S. Cl.
USPC ........... 715/236; 715/788; 715/825; 715/209; 715/205; 715/235; 707/693

(58) Field of Classification Search
USPC ........................... 715/209, 205, 235; 707/693
See application file for complete search history.

(56) References Cited

U.S. PATENT DOCUMENTS

| | | | |
|---|---|---|---|
| 5,802,533 A | 9/1998 | Walker | |
| 5,986,690 A | 11/1999 | Hendricks | |
| 6,223,191 B1 | 4/2001 | Truelson | |
| 6,279,017 B1 | 8/2001 | Walker | |
| 6,557,173 B1 | 4/2003 | Hendricks | |
| 6,738,978 B1 | 5/2004 | Hendricks | |
| 7,069,508 B1 | 6/2006 | Bever | |
| 7,111,252 B1 | 9/2006 | Harris | |
| 7,272,789 B2 | 9/2007 | O'Brien | |
| 7,298,851 B1 | 11/2007 | Hendricks | |
| 7,299,501 B2 | 11/2007 | Hendricks | |
| 7,401,286 B1 | 7/2008 | Hendricks | |
| 7,496,829 B2* | 2/2009 | Rubin et al. | 715/203 |
| 7,509,270 B1 | 3/2009 | Hendricks | |
| 2005/0034056 A1* | 2/2005 | Rubin et al. | 715/500 |
| 2005/0132284 A1* | 6/2005 | Lloyd et al. | 715/517 |
| 2008/0021861 A1* | 1/2008 | Fitzsimons et al. | 707/1 |
| 2008/0082911 A1* | 4/2008 | Sorotokin et al. | 715/236 |
| 2010/0268848 A1* | 10/2010 | Maurya et al. | 709/246 |
| 2012/0290919 A1* | 11/2012 | Melnyk et al. | 715/234 |

\* cited by examiner

*Primary Examiner* — Quoc A Tran
(74) *Attorney, Agent, or Firm* — Eric A. Gifford

(57) ABSTRACT

A system and method that converts the digital typesetting documents used in publishing to a device-specific format for electronic publishing. A "smart file and device-specific application" approach maintains the "look and feel" (design) of the source document used for print publication while typesetting for a specific device. Although this approach requires considerably more resources to create a smart file for each device-specific format, the smart file retains the unique typesetting characteristics of the printed book, is more aesthetically pleasing, and is easier to read. Furthermore, the device-specific application can render the smart file more quickly thereby eliminating any latency.

26 Claims, 14 Drawing Sheets

SYSTEM AND METHOD FOR CONVERTING THE DIGITAL TYPESETTING DOCUMENTS USED IN PUBLISHING TO A DEVICE-SPECFIC FORMAT FOR ELECTRONIC PUBLISHING

CROSS-REFERENCE TO RELATED APPLICATIONS

This application claims benefit of priority under 35 U.S.C. 119(e) to U.S. Provisional Application No. 61/152,358 entitled "System and Method for Converting the Digital Typesetting Documents used in Publishing to a Device-Specific Format for Electronic Publishing" and filed on Feb. 13, 2009, the entire contents of which are incorporated by reference.

FIELD OF THE INVENTION

This invention relates to the typesetting of documents using desktop publishing software, specifically converting documents created for publishing printed materials for device-specific electronic publishing.

BACKGROUND OF THE INVENTION

Composition programs such as word processing, desktop publishing, and typesetting or layout programs are used to create, edit, store, and output textual documents on a variety of digital computer applications. These computers include, but are not limited to, large mainframes connected to terminals, desktop or laptop personal computers, and handheld communication or digital devices. One of the functions of a composition program is to determine the position, organization, and arrangement of text for printing, display on a computer screen, or electronic storage. Documents often have a characteristic design, characterized by a combination of positive space and negative space. Positive space refers to the areas where ink, text, or objects are placed; negative space refers to the white areas of a page without ink, text, or objects, including areas between and surrounding text and objects. For a primarily text-based document, three factors that affect the appearance of positive space are: the size of the text on each line, the space between lines (leading), and the choice of typeface. Other factors that affect the appearance of text include the use of negative space around text blocks (areas where text is not placed, such as inter-paragraph space, paragraph indents, and document margins) and the use of textual or graphic elements to create visual points of interest, such as the use of a different typeface or different size for a chapter number or a chapter title.

Desktop publishing programs are used to create most modern printed materials, for example, books, magazines, and newspapers. These software programs such as Adobe InDesign® or QuarkXPress® use binary files, a computer file that stores data encoded in a binary form. Binary files can contain just text, or can include text with other data, including images. When they contain only text data and are without other data, they are called plain text files.

Desktop publishing software programs such as Adobe InDesign® or QuarkXPress® allow designers to create positive spaces that are uniform in appearance, and use standard typesetting techniques such as hyphenation, justification, etc. to achieve an even density of text at across a document, a page, or a paragraph. For print publishing, documents such as books, considerable effort goes into designing the appearance of documents to match the stylistic preferences of the publisher. This includes choices in the size and shape of pages, the size and shape of the "live area," (which can include text blocks, images, and other data) within the page, the typeface, type size and leading of text within text blocks or between text blocks. It can also include typographic design choices such as how typographic details such as hyphens, dashes, and ellipses can be used. Books of a specific imprint, by a specific author, or a specific series may be designed to have a particular appearance so that they match in certain design choices allowing a book series, for example, to be recognizable as belonging together, but still be easily differentiated from other series. In short, while books and other documents are essentially the same generic form at a functional level—text on a page—much effort is put into customizing or individualizing details within the documents and this is why books and magazines have such a variety of appearance in printed form.

With the prevalence of computers and the use of desktop publishing software to create printed documents, the contents of books are readily available in digital form. Electronic books (e-books) make use of this readily available digital content and many printed works are available in electronic form on web or for viewing on a specific device, such a personal computer, handheld device, or smartphone. E-books preserve the informational content (i.e., the plain text) of the printed form, but the details of the printed form, metadata such as typeface, type size, leading, indents, etc. are removed or altered to a more generic form, such as plain text. Modern typesetting software programs have data models that allow text content to be differentiated from design details, and this feature facilitates extracting the text content for use in other electronic forms, such as e-books. The downside to this approach is that design information and other metadata is not preserved and the content appears 'generic' and identical in appearance to other e-books regardless of the design considerations that were incorporated into the source document used for print publication.

E-books that use generic text store the text without metadata or with minimal metadata in a text or binary file. A software application reads the content from the file and composes the text for display on the device. Because the text or binary file that stores the text content has no or little metadata, the software application itself does the computations to determine the layout (arrangement of text on screen) and typographic details such as the typeface, the type size, size of negative space such as margins, etc. In this "Dumb File and Smart Application" approach to e-books, the appearance of the electronic version of the book is generated on the fly by the application from generic text content. A "Dumb File and Smart Application" approach allows for user-controlled typographic details (e.g., type size); however, because composition is rendered on the fly, display of text on the screen is limited by the processing speed of the device and the size of the document being rendered. On the fly rendering increases the latency of navigating through an e-book, which gives the user the experience of waiting for the screen to render as they read. Another limitation of on the fly rendering in the "Dumb File and Smart Application" approach is that text composition is limited to the availability of the fonts (digital typefaces) to the Smart Application or to the operating system of the device itself. This limitation may cause the "look and feel" ("design") of "Dumb File and Smart Application" e-books to differ substantially from the design of their print book sources.

The use of digital typefaces in printed books is a critical aspect of the appearance of the printed material, including the main text itself, but also other functional text elements that serve an ornamental function such as the book title, chapter titles, drop capitols, etc. Different typefaces connote different emotional responses and meanings in addition to the primary, literal meaning of the textual content itself. Book and other document designers customize the "feel" of a book by the selection of typefaces and where and how they are used within the document. This allows designers to impart subtle, but tangible meaning and is used creatively to set the tone and differentiate different genre of content.

Binary application files are the computer files used by desktop publishing applications such as Adobe InDesign® or QuarkXPress® to digitally design, compose, and output the exact appearance of the final printed material, such as a book. One method, the "Dumb File and Smart Application" approach, illustrated in FIG. 1, extracts text from the binary application files in a form free of metadata so that the plain text content can be used for display on multiple devices such as a Sony Reader or an Apple iPhone®. A rendering of the file that stores the data content is shown in 110. This file could be a desktop publishing application file or an output of a smart file such as a PDF (described below). This binary file is used to design the appearance of the document and arrange it for print either directly or via a PDF file. The content is extracted to a dumb file 120 that is "dumb" in that it contains only the textual content and has little or no metadata on the appearance of the text for presentation, e.g. a text (.txt) file. Because the file is "dumb," a smart application 130 on the e-book device such as an iPhone® or other handheld computer is required to compute where on the device display text from the dumb file will appear and how it will be rendered (typeface, size, etc). The rendered result 140 may differ substantially in appearance from the source (WYSIWYG) binary desktop publishing file 110 because the metadata present in the source file is absent in the dumb file 120.

PDF or other smart file viewer applications typically have several generic properties: (A) generic files: viewers can view any PDF file of any size, (B) generic display: viewers can display PDF files on any size screen, with options to scroll, zoom in or out to view the contents, and view multiple documents at the same time; document size and shape are typically discrepant from display size and shape, and (C) generic platform: PDF viewers function with the same user interface across multiple devices and multiple operating systems. Some PDF viewers allow the user to edit or search the PDF content. Critically, the viewer must be multi-purpose and generic enough to handle a variety of documents in a variety of conditions, and there is no tailoring of the user-interface, display functions, or navigation functions for the device, document, or content.

In current print production, desktop publishing programs output instructions to printers in a "smart" file format called Portable Document Format (PDF), which represents the printing instructions for composition of the text and other content in a format that is independent of the desktop publishing software, computer hardware, and operating system. A smart file contains the text content (just like a plain text file) and information about the appearance (typographic details the typeface, type size, kerning, character scaling, etc.) and position (exact location of lines, words, letters, etc.) of text and other content. A smart file predetermines the location and appearance of content.

A PDF file represents text content as text elements, which specifies the position on a page where characters should be drawn. Characters are specified using a font resource, a description of a digital typeface, and are either unembedded or embedded. Unembedded font resources rely on the host computer system to encode the digital typeface, whereas embedded fonts are encoded within the PDF itself at the cost of increasing the file size. The benefit of embedded fonts is that they allow viewing and printing of the PDF on computers and devices other than the one used to create the document, but still allow the fonts to be used and viewed. PDF is widely used as a cross-platform method to view documents destined for print on a computer display exactly as they would appear in final printed output because of its "what you see is what you get" (WYSIWYG) properties. Thus, the example of a page from a book shown in 110 illustrates a rendering of a WYSIWIG desktop publishing program binary file, a PDF that encodes these WYSIWIG properties for both computer display and printing, and also actual printed output.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The invention provides a system and method for converting the digital typesetting documents used in publishing, typically print publishing, to a device-specific format for electronic publishing. Our "smart file and device-specific application" approach maintains the "look and feel" ("design") of the source document while typesetting for a specific device. A smart file contains the text content (just like a plain text file) and information about the appearance (typographic details including the typeface, type size, kerning, character scaling, etc.) and position (exact location of lines, words, letters, etc.) of text and other content. Because text and other data are already composed (arranged) in a smart file, the device-specific application needs only to display it as is, the arrangement does not have to be computed on the fly. Unlike smart applications that must compute where text will appear and line/word wraps will occur at the ends of lines; smart documents pre-compute this information, so it is unnecessary for the device-specific application to do so. Although this approach requires considerably more resources to create a smart file for each device-specific format, the smart file retains the unique typesetting characteristics of the printed book, is more aesthetically pleasing, and is easier to read. The device-specific application is not required to provide the computations to determine layout or typographic details. An advantage of using a smart file is that a "dumb" device-specific application can render the smart file more quickly thereby eliminating any latency. Furthermore, the application can be "smart" in other ways to provide enhanced functionality.

In an embodiment, a computer-implemented method is embodied in a tangible medium for converting the digital typesetting documents used in publishing to a device-specific format for electronic publishing. The method is configured to execute the computer-implemented steps of configuring a device-specific binary file template that can be used for converting multiple binary file documents by setting the size of the template page to match the size of the device-specific display and determining device-specific typographic settings that are legible and readable. The typographic settings typically include type size, leading and margins for the page size. Content from one or more source binary file documents is placed into the template to create a device-specific desktop publishing document. The device-specific typographic settings are used to convert placed content to be legible and readable on the specific device and to preserve the look and feel (design) of the source document or documents. In particular, the relationship between the body text size of the source document and the template body text size may be used as a conversion ratio to convert the type size and other features of all non-body text in the source document to be proportional to the template body text and preserve the "look and feel" (design) of the source document. The desktop publishing application reflows the text and this re-typeset device-specific desktop publishing document is exported to a "smart file" using device-specific export settings. The smart file is paired with a device-specific application configured to display the one or more smart files on the device-specific display. The smart file may be wrapped with the application for distribution or paired with the application at the device-specific display.

A device-specific smart file is a binary file configured for display on the target device and in which all document data is pre-composed (i.e., the typographic details including the arrangement—exact position—of type has been predetermined). If the device includes software that can display smart files, the content can be read by displaying the smart file; if not, the smart file (e.g., PDF) can be "wrapped" in a device-specific application designed for storage of, distribution of, and display of the pre-typeset content inside the smart file. The device-specific application also allows for navigation control such as a bookmark of the current page, page forwards, page backwards, access to supplementary (secondary) content, and other movement through the document. The device-specific application does not change the appearance of the smart file or arrangement of its content, and thus can display the content very quickly.

In an embodiment, the template is created to match the target device. This is a blank or empty desktop publishing application binary file that has been constructed for displaying text on a page sized to fit precisely on the device display. The template is constructed so that body text is sized and line-spaced to be legible and readable on the target display. The characteristics of the body text are determined for use later in the source document conversion process. A "template" can be a one-size-fits-all solution, or can be a range of line-spacing choices such as small, medium, and large line spacing. Source documents for print may have a wide range of text leading because the large page depth (e.g., 38-42 lines per page) and variation in page size allow for many possible combinations of text and leading. Devices with small screens will have smaller page depths (e.g., 10-12 lines) and thus fewer combinations of text size and leading that will result in an integer number of lines per page. A template can be used to reflow source content from multiple documents for a specific device.

In an embodiment, content from a source file (desktop publishing application binary file; e.g., an InDesign® or QuarkXPress® file) are placed into the template and the body text is converted to the settings determined for the template. Next non-body text is converted in proportion to the body text so that the "look and feel" of the text in the source document is preserved in the template document. Manual overrides to text flow are removed, the text is allowed to reflow, and any new aesthetic problems such as page widows are removed as necessary.

In an embodiment, to export the document any printer-specific color channel information (e.g., CMYK) is converted to device specific display (e.g., RGB) and written to a PDF or other "smart" file that will preserve (embed) font information and other design details, including the look and feel and other data such as figures or other non-text data. A PDF will preserve the device-specific typesetting so that the arrangement of text and other data on the target device are "what you see is what you get" (WYSIWYG). Finally, this "smart" file that preserves typesetting detail may be "wrapped" in a device-specific PDF or other smart file viewer. Because the document type already contains instructions for how and where the type and other data are to be arranged on the page, the PDF viewer application may be "dumb" and need not compose the text and other data on the device. The PDF viewer allows for standard serial navigation (page forward and backwards) and also access to important structural sections (e.g. navigation to the next chapter or figure or footnote).

For structurally complex documents such as a text book that contains figures, footnotes, references, and other kinds of supplementary data or content, different data types may have separate device-specific display and navigation, allowing such secondary content such as footnotes, endnotes, pictures, audio, or video, for example, to be navigated independently from the text, but still allow the user to easily return to the source page content. This arrangement allows for parallel access to data within the document and "smart" features such as hyperlinks, data search, and annotation to be built independently of and in addition to the pre-composed text itself. This method of linking between data types allows creation of multi-dimensional digital books in which multiple smart files can be interlinked or a smart file can be linked to or interlinked with other data types. This page-based means of linking content and navigating device-specific documents contrasts with web navigation, a text-based means of navigating reflowable text content. Thus the invention allows for hyperlinking of multiple data types or content, but unlike hypertext, in which reflowable text is the source to other text locations or files, in the present invention, hyperpaging is used to link content. A hyperpage is a static, non-reflowable page in a smart file that has been typeset for a specific device that is the source link to a destination such as a typeset page in another smart file or to some other supplementary content file.

DETAILED DESCRIPTION OF THE PREFERRED EMBODIMENT

Figure 1:
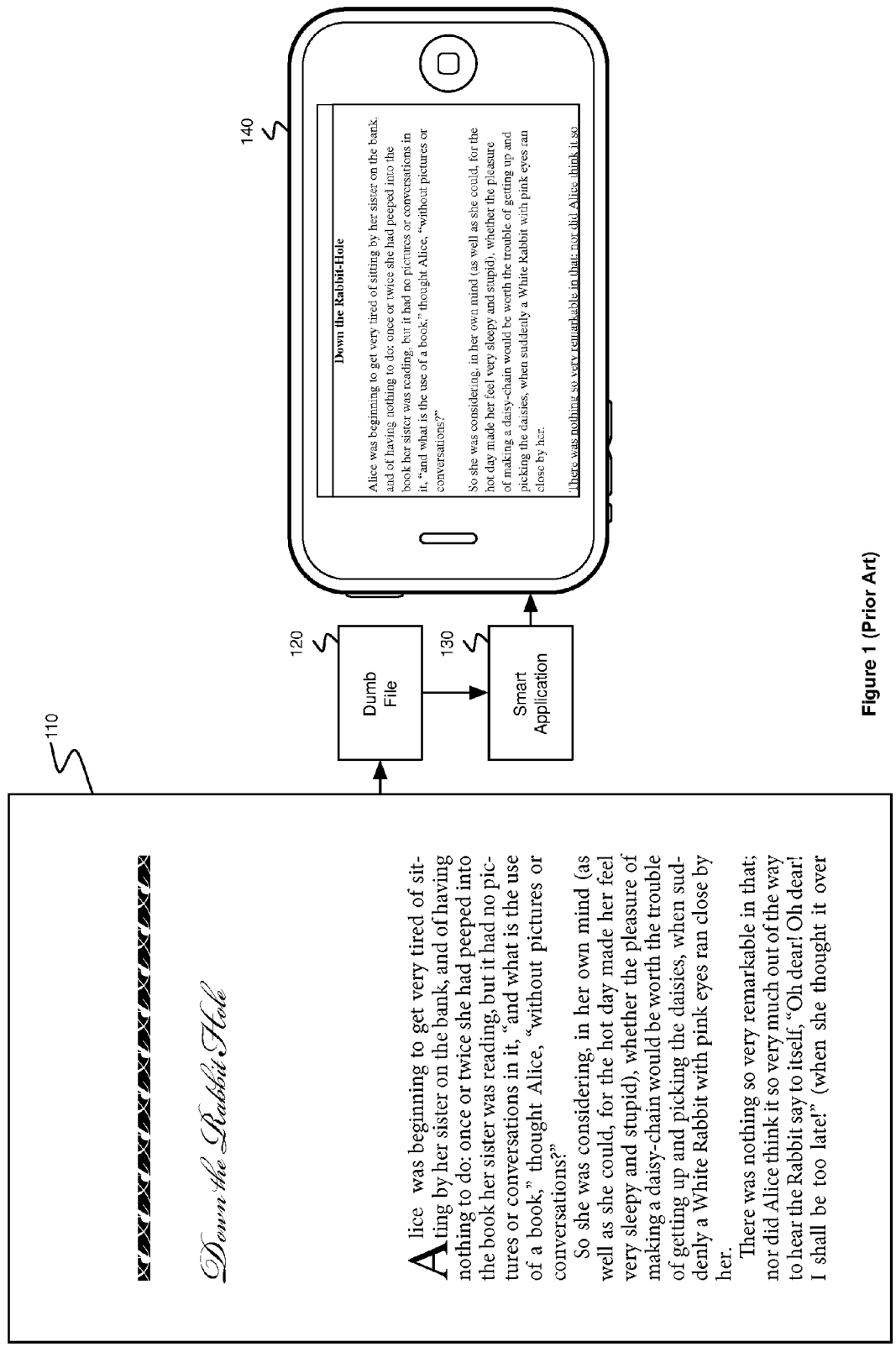
FIG. 1, as described above, is a diagram of a page of a source document used for print publication and the rendering of the page on an e-book using a Dumb File-Smart Application approach.

The invention provides a system and method for converting the digital typesetting documents used in print publishing to a device-specific format for electronic publishing. Our "smart file and device-specific application" approach maintains the "look and feel" of the source document used for print publication while typesetting for a specific device. Although this approach requires considerably more resources to create a smart file for each device-specific format, the smart file retains the unique typesetting characteristics of the printed book, is more aesthetically pleasing, and is easier to read. Furthermore, the device-specific application can render the smart file more quickly thereby eliminating any latency.

A smart file contains the text content (just like a plain text file) and information about the appearance (typographic details the typeface, type size, kerning, character scaling, etc.) and position (exact location of lines, words, letters, etc.) of text and other content. Because text and other data are already composed (arranged) in a smart file, the device-specific application needs only to display it as is, the arrangement does not have to be computed on the fly. The application also allows for navigation control such as a bookmark of the current page, page forwards, page backwards, and other movement through the document including secondary content. Smart applications must compute where text will appear and line/word wraps will occur at the ends of lines. Smart documents pre-compute this information, so it is unnecessary for the application to do it. The device-specific application does not have to be dumb, merely that it can be. The advantage being that a dumb application can render the smart file more quickly. Furthermore, the application can be "smart" in other ways to provide enhanced functionality. If the device includes software that can display smart files, the content can be read by displaying the smart file; if not, the smart file can be "wrapped" in a device-specific application designed for storage of, distribution of, and display of the pre-typeset content inside the smart file. The application is a software program including a sequence of instructions to a CPU to render the smart file.

In an embodiment, a computer-implemented method is embodied in a tangible medium for converting the digital typesetting documents used in publishing to a device-specific format for electronic publishing. The method is configured to execute the computer-implemented steps of configuring a device-specific binary file template that can be used for converting multiple binary file documents by setting the size of the template page to match the size of the device-specific display and determining device-specific typographic settings that are legible—quick and easy to read and comprehend—and readable—attractive and pleasurable or interesting to read. The typographic settings typically include type size, leading and margins for the page size. Content from one or more source binary file documents is placed into the template to create a device-specific desktop publishing document. The device-specific typographic settings are used to convert placed content to be legible and readable on the specific device and to preserve the look and feel of the source document or documents. In particular, the relationship between the body text size of the source document and the template body text size may be used as a conversion ratio to convert the type size and other features of all non-body text in the source document to be proportional to the template body text and preserve the "look and feel" (design) of the source document. The desktop publishing application reflows the text and this re-typeset device-specific desktop publishing document is exported to a "smart file" using device-specific export settings. The smart file is paired with a device-specific application configured to display the one or more smart files on the device-specific display. The smart file may be wrapped with the application for distribution or paired with the application at the device-specific display.

Figure 2:
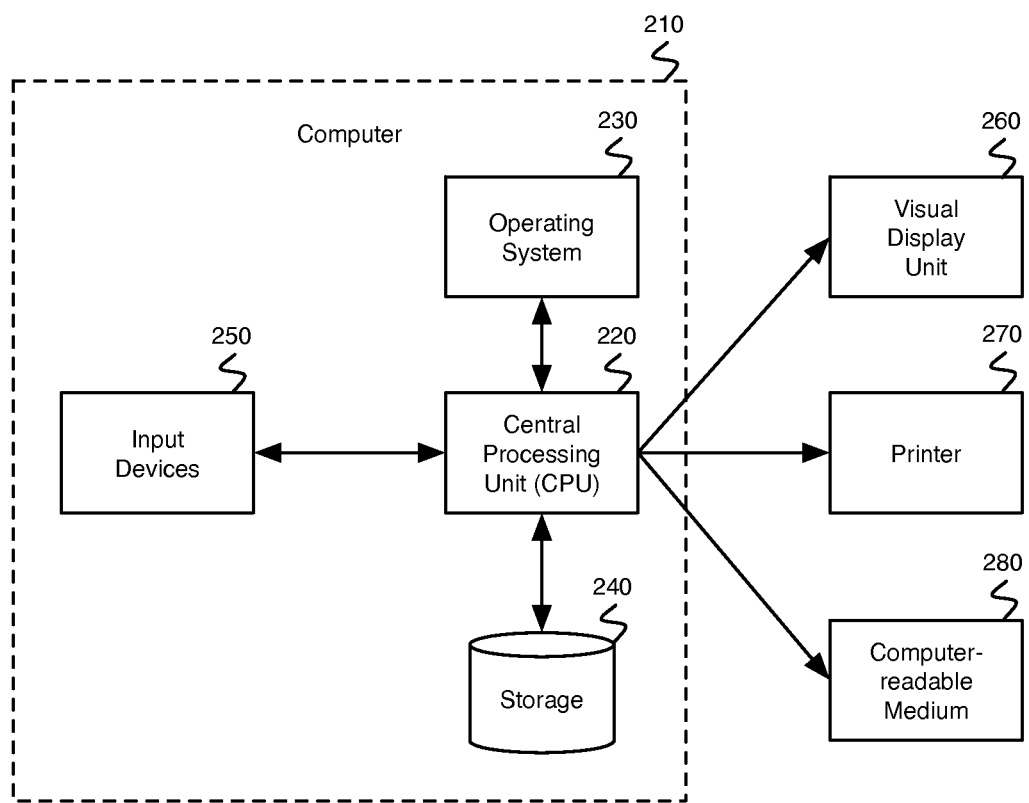
FIG. 2 is a block schematic diagram of a computer system embodying the present invention for typesetting text for device-specific storage, navigation, and display.

A block schematic diagram of a typical computer system required to implement the preferred embodiment of the invention is shown in FIG. 2. A computer system 210 consists of a central processing unit (CPU) 220, controlled by an operating system 230, connected to other peripheral or integral equipment: storage 240; one or more input devices 250 such as a keyboard with or without a mouse or a touch screen and output devices such as a visual display unit (VDU; computer monitor or screen) 260, a printer 270, a separate storage device or computer-readable medium 280. Data may be input to the CPU 220 and stored in storage 240 via one of the input devices, a tangible media (e.g. text input via a binary file on a disk) or via the Internet, for example. The computer system's storage 240 may consist of random access memory (RAM), read only memory (ROM), and magnetic or optical storage media such as disk drives, CD ROMs, DVDs, flash drives or the like. The computer system 210 may be for example, a mainframe, a personal (desktop) computer, or a handheld computer. Examples of personal computers include hardware that run operating systems 230 such as Microsoft Windows®, Mac OS X®, and Linux. The computer system or any part of it may be shared within local area networks, wide area networks, the Internet, or any other system of linked computer networks. Examples of a visual display unit 260 include desktop computer displays or monitors and also handheld computer displays. A computer readable medium 280 allows input and output of data in computer files via storage media or computer networks.

A computer system outlined in this diagram (e.g., a desktop computer or a server) could be used to create a smart file using desktop publishing application software run by the CPU 220. A desktop or a handheld computer system could also be used to store a smart file 240, navigate within a smart file via keys, mouse, touch screen or other input 250, and display a Smart file on a visual display unit 260. Examples of handheld computers include pocket PCs and personal communication devices such as a mobile phone or smartphone (e.g., Apple iPhone®), e-book readers (Sony Reader or Amazon Kindle®), personal data assistants (PDAs), or other kinds of handheld computers (e.g., iPod® or iPad™) used for email, web-browsing, multi-media, or text display. These devices include a CPU for executing the application to render the smart file on a display. A computer system could also be used to output a smart file to a printer 270 or for distribution over the internet or to a computer-readable medium 280.

Figure 3:
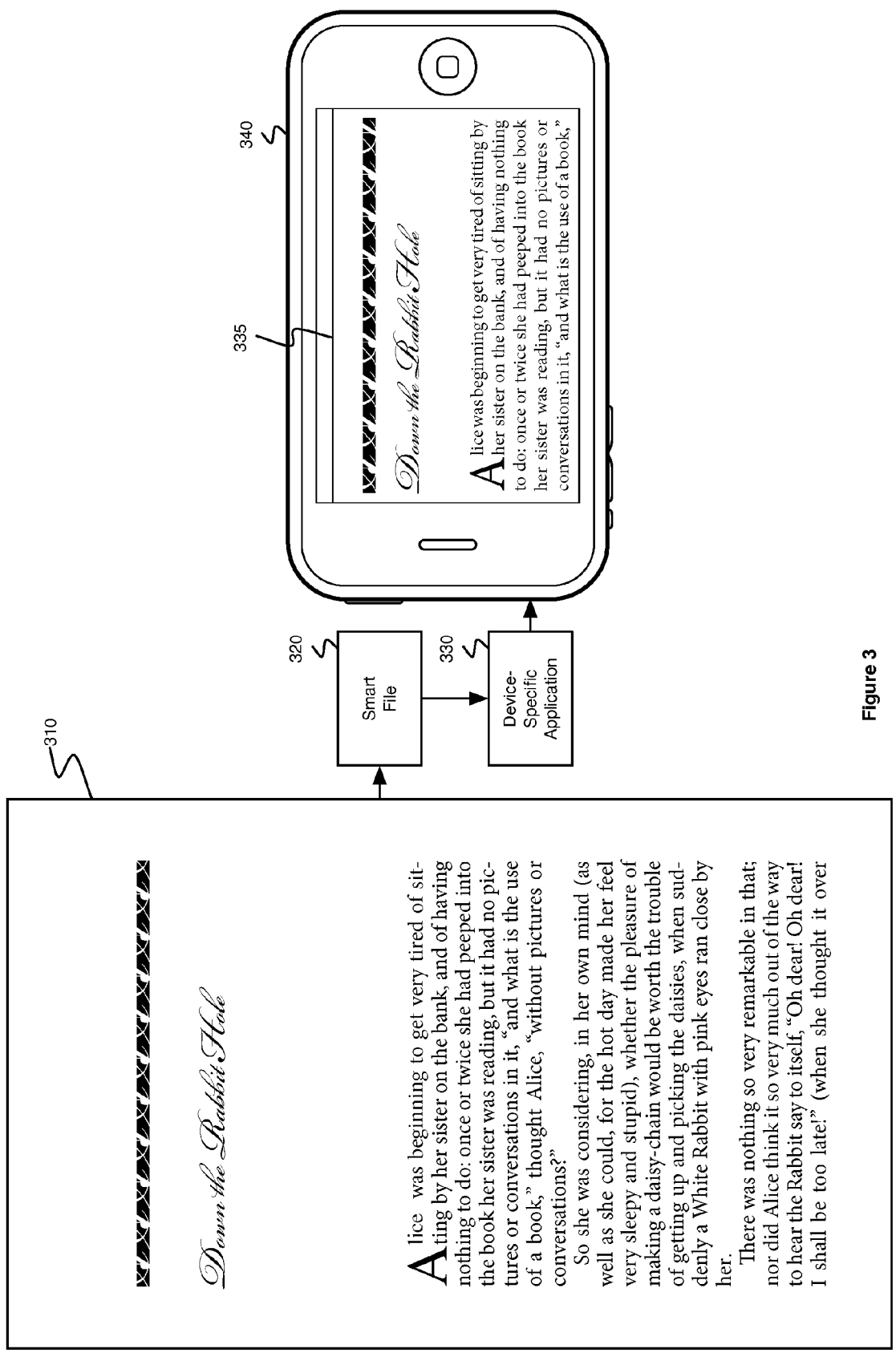
FIG. 3 is a diagram of the page of the source document used for print publication and the rendering of the page on an iPhone® using a Smart File-Device-Specific Application approach in accordance with the present invention.

FIG. 3 illustrates the use of a smart file and device-specific application approach in accordance with the present invention to produce electronic books from the binary application files used to create print books. A rendering 310 of a desktop publishing binary file is shown. Binary application files are the computer files used by desktop publishing applications such as Adobe InDesign® or QuarkXPress® to digitally design, compose, and output the exact appearance of the final printed material, such as a book. The computer transforms the binary application file into the smart file 320. The combination of a "smart file" 320 and "device-specific application" 330 produces a rendered result 335 on a visual display device 340 that is device-specific (e.g., the Apple iPhone® or Amazon Kindle®) and maintains the look and feel of the rendering 310 of the binary application file used to make printed books because the metadata is maintained and adapted, but is never discarded. Because the files must maintain metadata about the appearance of the text content throughout this process, a "smart" file format such as a PDF must be used as output to preserve the appearance of these typographic details. For a device capable of displaying PDFs, a device-specific application need not be complex—it must correctly render the PDF and allow the reader to navigate to different locations within the PDF document, which is already "smart" (rich in metadata) about the exact arrangement and appearance of the text. The display device includes a CPU that executes the application to render the smart file to its display.

"Look and feel" or "design" includes micro- and macro-typographic features. Micro-typographic features include specific design choices in text appearance such as use of particular fonts, typefaces, type sizes, and line-spacing, etc. or assigning combinations of fonts, typefaces, type sizes, and line-spacing to particular elements or structures within a document. Macro-typographic features include the overall use of positive and negative space across a page, document sections, or the whole document, both within objects and between objects, including the main text and other data such as figures, graphic elements, or chapter title labels. Relative proportions in the positive and negative space among elements or overall to reference items such as the main text block or the page itself define a particular look and feel for data elements. In preserving the look and feel, these factors must be adapted from the source document to the device-specific document to be displayed.

Figure 4:
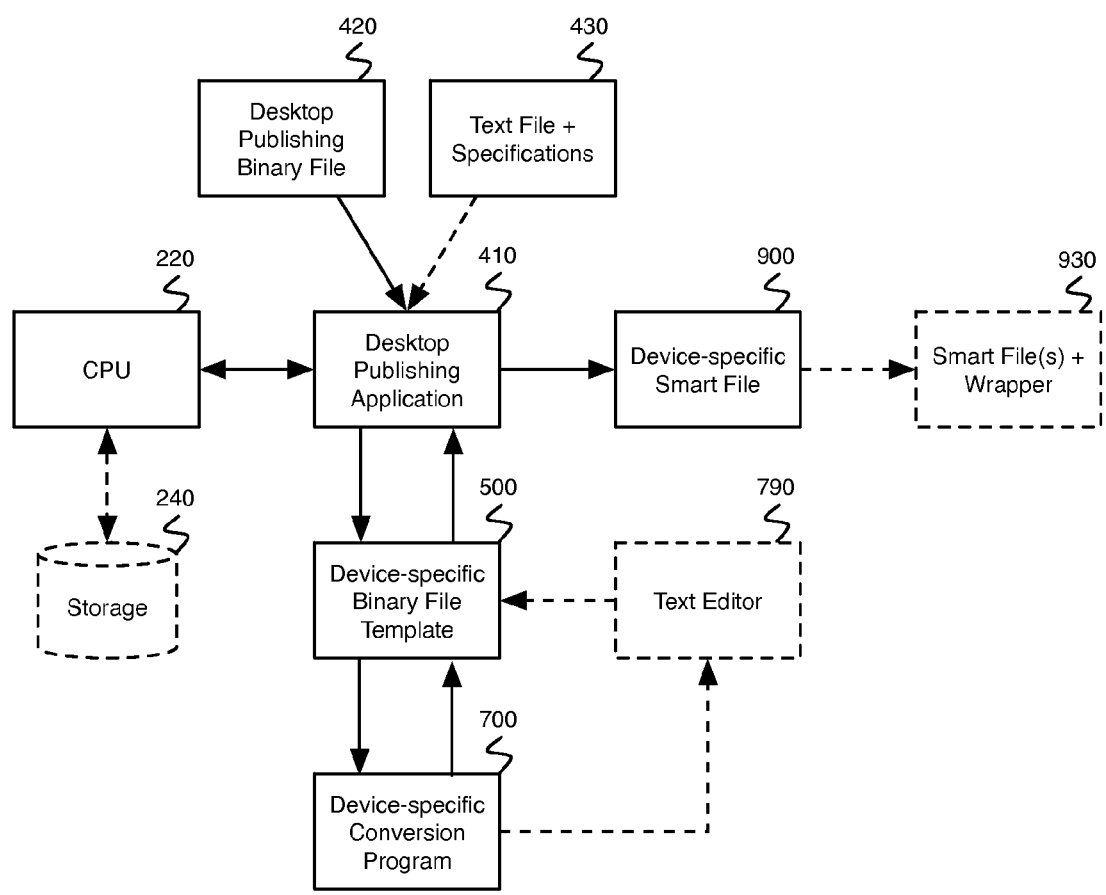
FIG. 4 is a flowchart of the structure of the data and programs used to implement device-specific electronic publishing in an embodiment of the invention.

FIG. 4 broadly illustrates the typical structure of data (binary files) and programs (applications) within the storage 240 that are used by the CPU 220 to implement the preferred embodiment of this invention, use of a smart file and a device-specific application to render a digital book customized for a specific device display. This data includes a desktop publishing application 410 such as Adobe InDesign® or QuarkXPress®, and one or more binary files such as a desktop publishing binary file 420, shown as renderings 110 in FIGS. 1 and 310 in FIG. 3. In a preferred embodiment, the desktop publishing binary file 420 would be an InDesign® or QuarkXPress® document used to typeset printed documents such as a book. The binary file includes the data file itself, and also associated files such as fonts, artwork, or other data necessary to publish the printed document. In another embodiment the data may include a text file 430 and set of specifications by a book designer for the look and feel of the text content that are used to create a desktop publishing binary file via the desktop publishing application 410. The text file could be a Microsoft Word or other word processing or text file. The specifications could be data that is entered by a book designer into a data sheet or web database that determine the look and feel of each text element type in a book or other document. Some printed documents are typeset using multiple binary files for different sections of a document (e.g., front matter, main text, and back matter) and thus several binary files constitute the entire printed document. The binary file or files 420 have been configured using the desktop publishing application 410 for output via a smart file such as a portable document file (PDF) or other format to printer. As part of this configuration, these source documents are custom designed to fit the page dimensions of the final printed object. The examples of a page from a book shown in renderings 110 in FIGS. 1 and 310 in FIG. 3 illustrate a rendering of (A) a WYSIWIG desktop publishing program binary file, (B) a PDF that encodes these WYSIWIG properties for both computer display and printing, and also (C) the actual printed output.

A device-specific binary file template 500 is created using the desktop publishing application. This template is designed for typesetting of text and other data onto fixed-layout pages configured for the target display device such as an Apple iPhone®, Sony Reader, or other device or computer capable of displaying 2-D vector graphics.

A device-specific conversion program 700 places the content from the desktop publishing binary files such as an InDesign® or QuarkXPress® document into the device-specific template and converts the typographic settings within the template using the typesetting controls of the desktop publishing application.

The desktop publishing application 410 exports a device-specific smart file 900 (e.g., a PDF) created using export settings configured for the device on which the document is to be displayed. If the target device can display the smart file using software built into the operating system or third party application software, the document is ready to be viewed. If the target device does not have a built in or other smart file reader, then in an embodiment, the smart file is "wrapped" with a device-specific storage, navigation, and display program (application) 930. For copyrighted content, digital rights management can be accomplished by securing either the smart file 900 and/or the wrapped smart file 930 with encryption.

Figure 5:
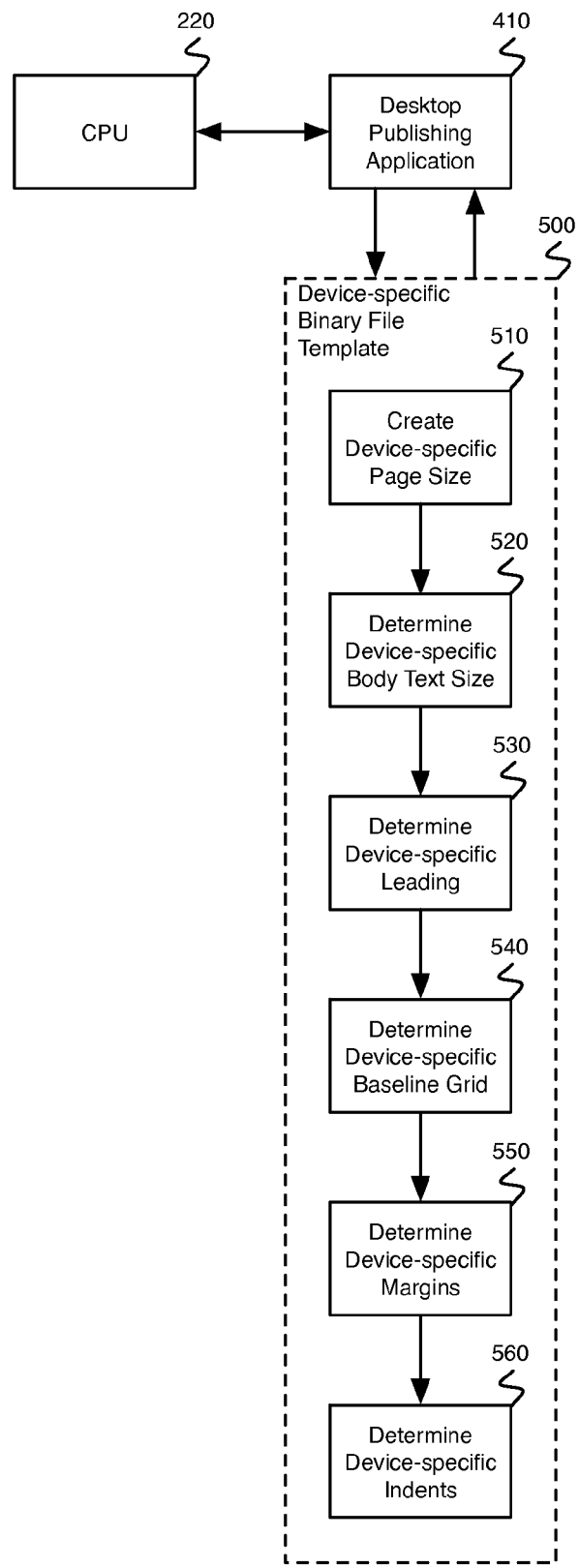
FIG. 5 is a diagram illustrating an embodiment for configuring a desktop publishing application binary file as a device-specific template for converting and reflowing text and other data from typesetting documents used in print publishing.

FIG. 5 illustrates an embodiment for configuring a desktop publishing application binary file as a device-specific template for reflowing text and other data from typesetting documents used in print publishing. A device-specific template is constructed to be "specific" for typesetting and displaying text on a particular device display; however, the template is "generic" in that it can be used to convert and reflow multiple documents. The template could be an actual desktop publishing application template (i.e., a locked or read only binary file), or a set of specifications for how to create a new desktop publishing binary file specific for this purpose. Configuring a device-specific desktop publishing application binary file as a template includes (A) setting the page size to match the target display size, and (B) determining the typographic settings including size and other parameters of the body text within the template for future use in the conversion program using sample text from a corpus. Once determined, the template is then cleared of all text so that it is 'blank' and can be saved to later be filled with source document content. The determination of the body text for a specific device is done relative to the device-specific template; the conversion method itself takes place in a different step described later (See conversion program 700 FIG. 7). The template and the parameters for how the body text of a generic document is configured within a template 500 are outlined in FIG. 5 and described below.

Figure 6:
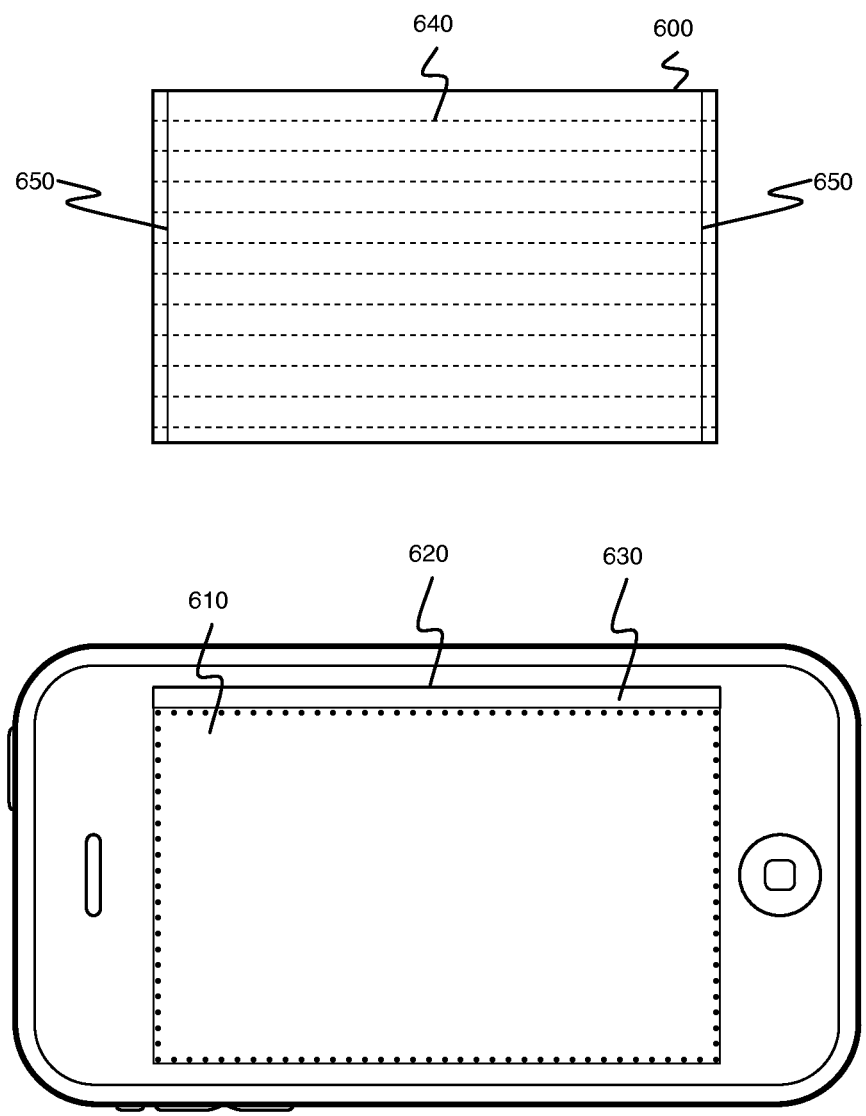
FIG. 6 is a diagram of a device-specific template.

To create a device-specific binary file template 500 for the target device using the desktop publishing application 410 the template is first constructed (i.e., set during document creation) to match the dimensions of the display on the target device by specifying the dimensions of the page size of the template binary file to match the dimensions of the target device's display (step 510). FIG. 6 illustrates the structure of a template 600 and how the template's dimensions match the display area dimensions 610, illustrated by the dotted line. In an embodiment shown in FIG. 6, the page size of the template 600 and the display area 610 (which match each other) may differ in dimension from the physical dimensions of the target device display 620 if the reading space is designed around device user-interface or information elements that are always displayed, for example the status bar 630 on an iPhone® that indicates signal strength, time, and battery level. If no user-interface or information elements are displayed, in another embodiment (not shown in FIG. 6), the template is sized to match the entire display 620. A device-specific page size allows document pages to be displayed on a device so that they are seen in their entirety without cropping, resizing, or scrolling of the page document.

Next, device-specific body text size is determined (step 520). A test corpus or corpora are placed into the template. The corpus or corpora could be generic and from a range of different text sources or be specific for a particular language or genre. Text size is assigned to a range (e.g., 7 pt to 14 pt) and step size increment (e.g., 0.25 pt increments). Starting at the lower boundary of the text size range, text is formatted to that size and one or more measures of horizontal text density are computed. Measures of horizontal text density computed include the number of characters per line, number of words per line, other measures, or a composite measure of horizontal text density that affects readability and legibility. Sampling of the text corpus may include all lines in a document or be restricted to only all full lines of text, e.g., the first line(s) of a paragraph with an indent or a drop capital and/or the last partial line of a paragraph may be excluded from this computation. Once the measure or measures of horizontal text density computed, the text size is incremented by the step size and the horizontal text density recomputed and stored. This process is repeated until the upper text size range value is reached. The text size increment that produces a mean or other measure of central tendency of horizontal text density that is closest to the desired ideal measure of horizontal text density is selected. For example, some scientific research suggests that reading comprehension and speed are best between 8 and 10 words per line. Thus if the target ideal horizontal text density is 9 words per line, then the text size that is closest to achieving a mean horizontal text density of 9 words per line for the device-specific template is selected. In an embodiment, this process could be iterative and use progressively smaller ranges and step size increments to select the target density. This device-specific body text size is used to assign the "main" body text of a document and ensure that reading text will be ergonomic for that device.

Once horizontal text density for the template has been set to a legible and readable size and the body text size determined in step 520, the vertical text density is set by determining the device specific leading (also called line spacing; step 530). Vertical text density is determined by the leading, the size of the text plus the space between the lines, e.g., 10 pt text with 1 pt of space between lines has 11 pt leading. To avoid having a partial line of text at the bottom page, the vertical size of the screen divided by the leading must be an integer. To avoid letter ascenders from touching the top of the display or letter descenders from touching the bottom of the display, the vertical size of the screen can be adjusted to be a smaller, effective vertical size, but this effective vertical size divided by the leading must be an integer to ensure no partial lines of text. Similar to the determination of horizontal text density, a range of vertical text density (e.g., 9 to 15 points of leading) and a step size increment (e.g., 0.25 pt increments) increment are assigned. The number of lines of text per page are computed for each increment and non-integer numbers are discarded. The remaining integer choices of vertical text density are stored for use in creating one or more document-specific baseline grids (step 540). The information about which leading selections create an integer number of lines (i.e., with no partial lines) is used to create one or more templates with different baseline grids). These different templates can then be used to select the leading that will combine with the body text size 520 that produces a text size to leading ratio that is closest to the body text size to leading ratio in the document to be converted. The step allows the "look and feel" of vertical density of the text block to be preserved as closely as possible within the constraint of having no partial lines of text at the top and bottom of device display.

For each leading choice, the baseline grid is set to the device-specific leading determined in step 530 and the offset from the top of the page is set to half of the difference of the actual page size less the effective page size (step 540). This will center the lines of text such that an even amount of negative space appears at the top and bottom of the page and that no text lines are cut off or partially visible at the page boundary (step 550.) An illustration of a baseline grid 640 within a template is shown as dashed lines in FIG. 6. The baseline grid in this example rendering of a template is offset from the top and incremented so that a block of text aligned to the grid appears as vertically centered with room for letter ascenders above the top line and room for letter descenders below the bottom. In an alternative embodiment, vertical margins are created and the document grid offset is set to be the top margin. In a third embodiment, a baseline grid is not used, but the equivalent grid-like result is achieved by setting the text frame origin to the baseline grid offset and using equal text size and equal line-spacing (leading) throughout the text frame to match the body text size determined in step 520 and line-spacing determined in step 530.

Next, the left and right margins 650 are set to match the baseline grid offset or vertical margin (step 550). These margins may be smaller than margins on books or other documents to both (A) increase the economy of the display and (B) incorporate factors such as the size of the display and the non-display parts of the device. For example on handheld devices, the template may be designed to decrease the use of white space outside the text block such as margins to increase use of the space available for textual display. Similarly, devices which have physical parts of the device that serve as structural or design features may serve as a physical margin, and eliminate or reduce the need for electronically displayed margins within the display. Thus, the device specific margins may differ from the original document margins because the structure of the device itself has physical margins, so the total apparent margin is a combination of the physical device itself and a portion of the display.

Last, once device-specific margins have been determined in step 550, then device-specific body text paragraph indents are determined (step 560). The body text paragraph indent size is selected to be one of several parameters used in typesetting practice to provide a negative space in proportion to the text itself: (A) an em, a measure relative to the body text size determined in step 520, (B) the leading, determined in step 530, or alternatively (C) the device-specific left and right margin size, determined in step 550, or another proportion related to one of these text properties. Determining device-specific indents ensures that the indents for the body text paragraphs are in proportion to the device-specific text and the text highly readable.

Construction and configuration of a device-specific template could be accomplished via manual inputs and adjustments made via the desktop publishing application 410. In an alternative embodiment, creation of a device specific template could be semi-automated and interactive by prompting a desktop publishing program user to specify certain parameters such as the target display size, etc., while other parameters such as determining a body text size that achieves a target mean horizontal text density (e.g., 9 words per line) are automatically computed. In another embodiment, creation of the template may be fully automated by providing a device-specific file that specifies the parameters.

Figure 7:
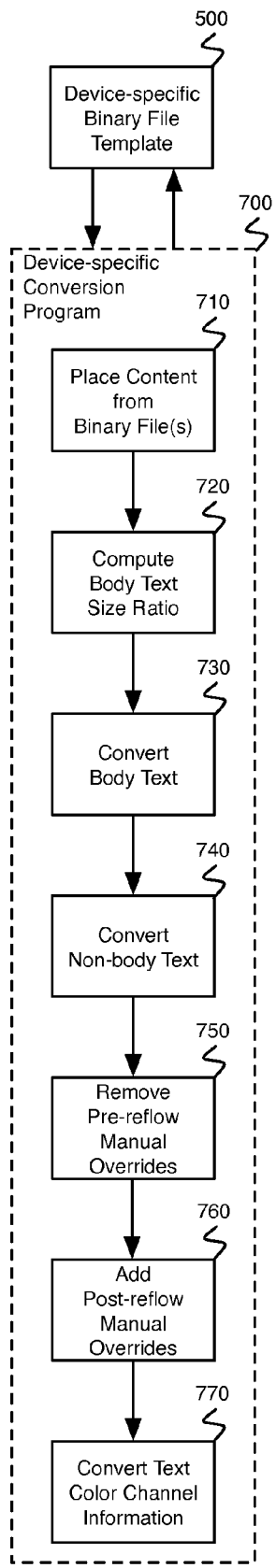
FIG. 7 is an embodiment of device-specific conversion method to place and adjust media content from desktop publishing documents into a device-specific binary file template.

FIG. 7 illustrates an embodiment of the device-specific template 500 used in conjunction with a device-specific conversion program 700. Content from the source document or documents is placed into the device-specific template 500 (step 710) to create a device-specific desktop publishing document. All of the elements and their order are preserved in the process. In an embodiment, content that includes a mixture of text and other data such as artwork or footnotes are placed in the template with their interleaved order preserved.

Once content from the source document(s) is placed in the template, the device-specific typographic settings are used to convert the content to be legible and readable on the specific device and to preserve the look and feel of the source documents. More particularly the ratio of the body text size determined for the template (from step 520) to body text size of the source document is computed and stored (step 720). Next, the body text in the template is converted to the determined body text size (step 730). As part of step 730, other body text settings that were determined and stored during template construction are also converted, including: device-specific leading (step 530), device specific margins (step 550), device specific-indents (step 560), and the text is set to align to the device-specific grid (step 540).

Next, all non-body text is selected and converted (step 740) using the conversion ratio determined and stored in step 720. This step is done differentially for each unique type of non-body text. This ensures that the relative size of non-body text elements to body text in the source document is preserved in the converted document.

Next, manual overrides to text reflow such manual (soft) returns, manual hyphenation, and keep with next constraints are removed as necessary (step 750) so that the desktop publishing application can reflow the text within the template without the now incorrect custom overrides from the source document. These overrides were applied in the source document to correct local aesthetic problems, e.g. page or paragraph widows. Once text has been reflowed, new different local aesthetic problems may occur and these can be corrected manually or automatically through standard techniques (step 760); however, because the document must be allowed to reflow within the new template these aesthetic problems will be specific to the new parameters of the text content and the device-specific template and thus the source document overrides must be removed.

Last, text color channel information is converted for display on the target device (step 770). For example, a source document intended for print publication that uses CMYK settings of 0% cyan, 0% magenta, 0% yellow, 100% black is converted to 100% cyan (C), 100% magenta (M), 100% yellow (Y), 100% black (K). If such device-specific color channel conversion is not done, then 100% black CMYK text will appear as "mostly black" (approximately 90% red, green, and blue) on a RGB (red, green, blue) color display. Printers often elect to save ink by printing black only via the black (K) channel; however, this cost-saving measure is not a concern for digital display and thus this step ensures that black text is displayed as darkly as possible, enhancing contrast and legibility on the specific device.

The steps described for placing and converting content from the source document into a device-specific template could be preformed manually within the desktop publishing application 410. In an embodiment, these steps could be semi- or fully automated using scripting or other computer software programs that interface with the text content through the device-specific template 500 and the desktop publishing application 410. In an embodiment, a script or other program can either directly change the settings via the desktop publishing application. In an embodiment, these text and other content can be exported to a text editing application, converted via scripting within the text editing application, and then the converted content is replaced into the device specific template 500 where it is allowed to reflow. The use of an intermediate text editing program 790 for scripting conversion is optional, but may convert text content faster than via the desktop publishing application despite the extra step involved.

Figure 8A:
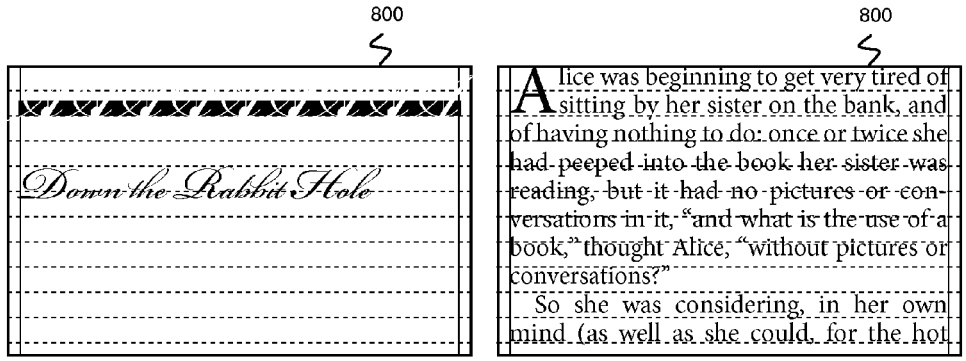
FIGS. 8a through 8d are renderings of text at each step of the conversion process.
Figure 8B:
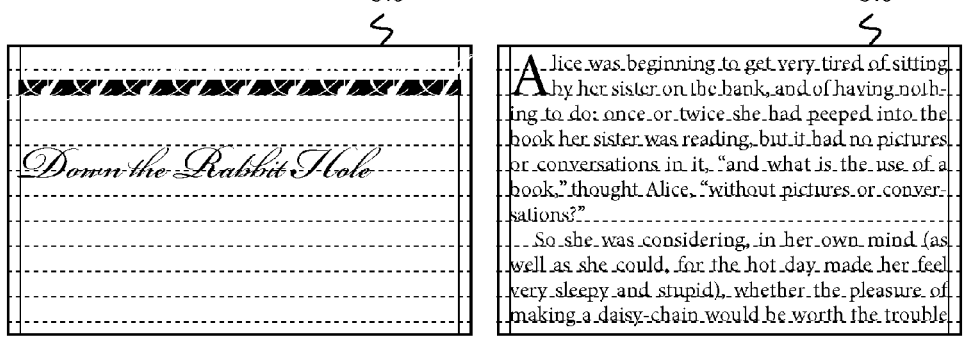
Figure 8C:
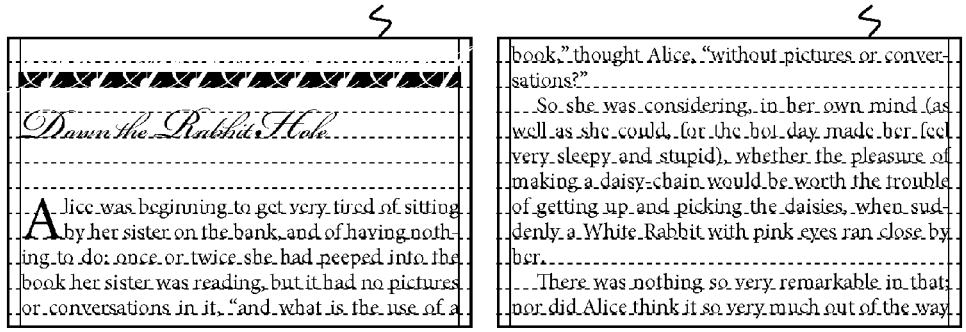
Figure 8D:
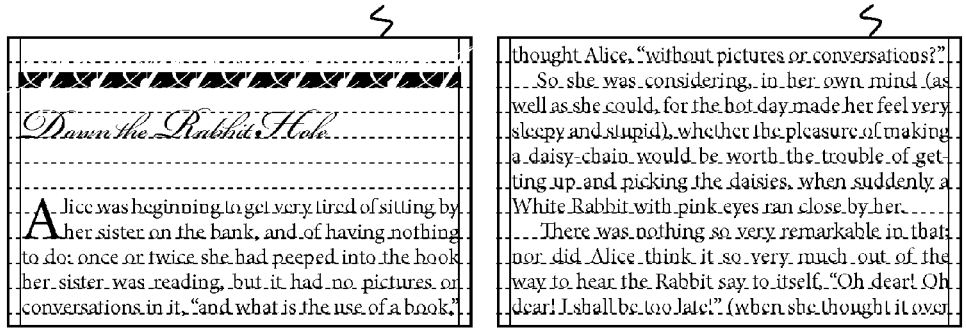

A rendering 800 of a desktop publishing document created by placing content from a source desktop publishing application document 420 into a device-specific template 500 (step 710) but before conversion (steps 720-770) is shown in FIG. 8A. Note that text is the same size as in the source file 310 shown in FIG. 3 and is not aligned to the device-specific baseline grid 640 shown in FIG. 6. A rendering 810 of the desktop publishing document after step 730 is illustrated in FIG. 8B. This rendering shows the first two pages of this template document. Note that body text has been converted and aligned to the device specific grid, and is more legible (improved type size) and readable (leading and margins more attractive) than in FIG. 8A. However, non-body text such as the title have not been converted and still remain off the grid and original size. A rendering 820 of the desktop publishing document after step 740 is illustrated in FIG. 8C. Note that non-body text such as the title "Down the Rabbit Hole" has been converted and aligned to the device specific grid. The style for this title includes separate type sizes for the uppercase letters and the lowercase letters; these two size parameters have been separately converted in proportion to the new body text size using the stored conversion ratio. The line spacing between the title and the first paragraph of text has also been converted. A rendering 830 of the desktop publishing document after step 760 is illustrated in FIG. 8D. Manual overrides from the source document have been removed and new overrides to remove the hyphen on the first line and the paragraph widow (the three letter word "her") in the second paragraph of the right hand page (page 2) of FIG. 8C. These are examples of two typographic style or aesthetic constraints that if implemented as manual overrides in the source document would be inappropriate for the template document and would need to be re-determined after text reflow.

Figure 9:
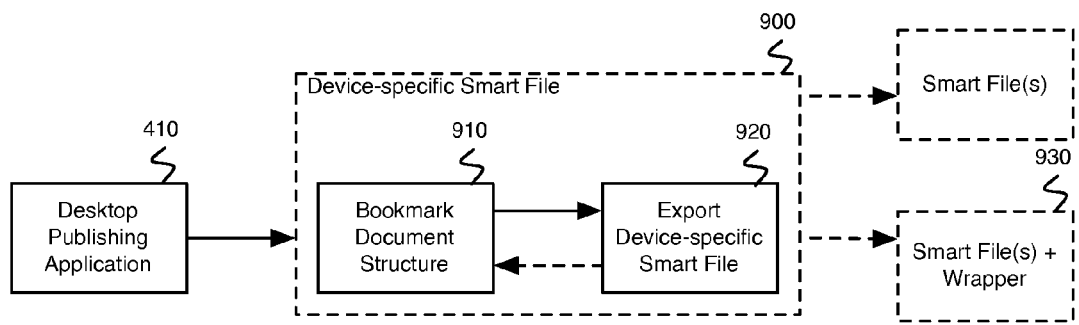
FIG. 9 is a flowchart illustrating an embodiment for device-specific fixed-layout output to preserve the text, fonts, and images that comprise the desktop publishing document for device-specific storage, navigation, or display for reading.

FIG. 9 illustrates how once document content is converted for the device-specific template, the content is outputted for device-specific distribution, display, and storage. Creation of a smart file 900 that can be navigated involves two steps, (A) bookmarking document structure, such as parts or chapters (step 910) and (B) exporting a device-specific smart file (step 920). In a preferred embodiment, bookmarking is done within the desktop publishing application 410 and using document specific character or paragraph styles to find and bookmark structural elements of the document such as chapters. Next, device-specific color channel output settings are used to create a PDF or other kind of smart file (step 920). For example, if the target device is an Apple iPod® or iPhone®, then when exporting the template contents to a smart file such as a PDF, Apple RGB color settings are selected to ensure that black text, for example, is displayed with maximal darkness on the iPod® or iPhone® display that the document will be viewed on. Using device-specific color channel information also ensures that other color information such as color photos are displayed optimally for the target device. In an alternative embodiment, when character or paragraph styles are not present in the source document or if the desktop publishing application cannot create bookmarks, the smart file 900 is exported first, then bookmarks are created 910 manually or interactively using a semi-automated search mechanism via a smart file reader such as Adobe Acrobat®.

The bookmarked smart file 900 can be viewed on any device capable of displaying and navigating smart files; however, the smart file may not display without resizing, scrolling, or other adjustments on devices other than the device it is specifically designed for. For devices such as an iPhone® that do not have a PDF viewer, the smart file is "wrapped" in a stand alone application 930 that allows distribution, storage, navigation, and display of the PDF on the iPhone®.

Figure 10:
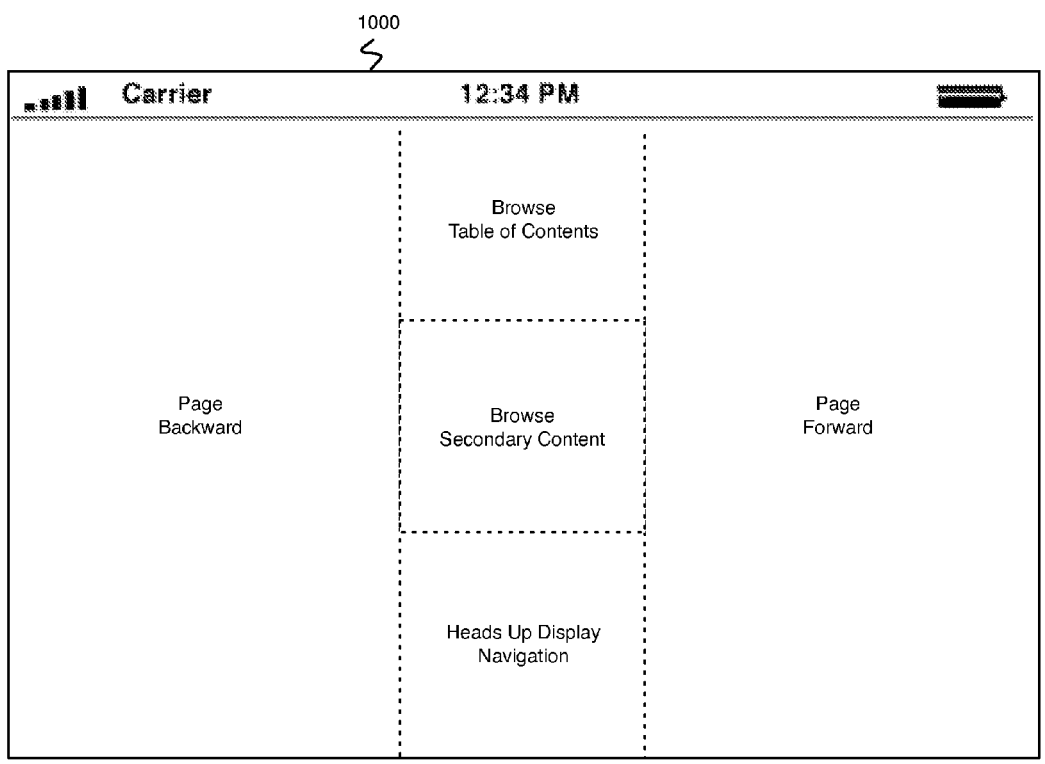
FIG. 10 is an embodiment of a "device-specific application" wrapper around a "smart document" to allow document navigation.

FIG. 10 shows an embodiment of a user interface 1000 for a device-specific application wrapper around a "smart file" (e.g., a PDF) that preserves metadata. The application is a smart file viewer with basic navigation tools. The wrapper displays one page of the smart document at a time such that no resizing, cropping, or scrolling is required to view the page contents. In an embodiment, on a device with a touch screen such as the Apple iPod®, iPhone®, or iPad™, the user can touch the interface 1000 as shown in FIG. 10 to access different navigations functions. Examples of navigation functions for the main text content that could be accessed in the user-interface include functions such as page forward, page backward, browse the table of contents, return to the most recently viewed page, a heads up display for fast, random access navigation, and browse optional secondary content. Heads up display navigation includes a display of navigation tools to advance to the previous or following bookmark (book part or chapter) and fast scrolling to randomly access any part of a document or to quickly browse the document. Although a device-specific application can be "dumb" in that it is only required to have minimal display and navigation features because the smart document specifies text appearance and arrangement, the application can be "smart" in other ways with features such as linked data (links to data in other documents, links to the URLs of supplementary content on the web, or links to other data on the device), data search, user annotation, and dictionary, thesaurus, or encyclopedia (e.g., Wikipedia) lookup, a document-specific glossary, or a document-specific index. A smart document viewer and navigator application will display and navigate quickly because the content is pre-rendered in the smart document; no on the fly rendering of text content is required.

Figure 11:
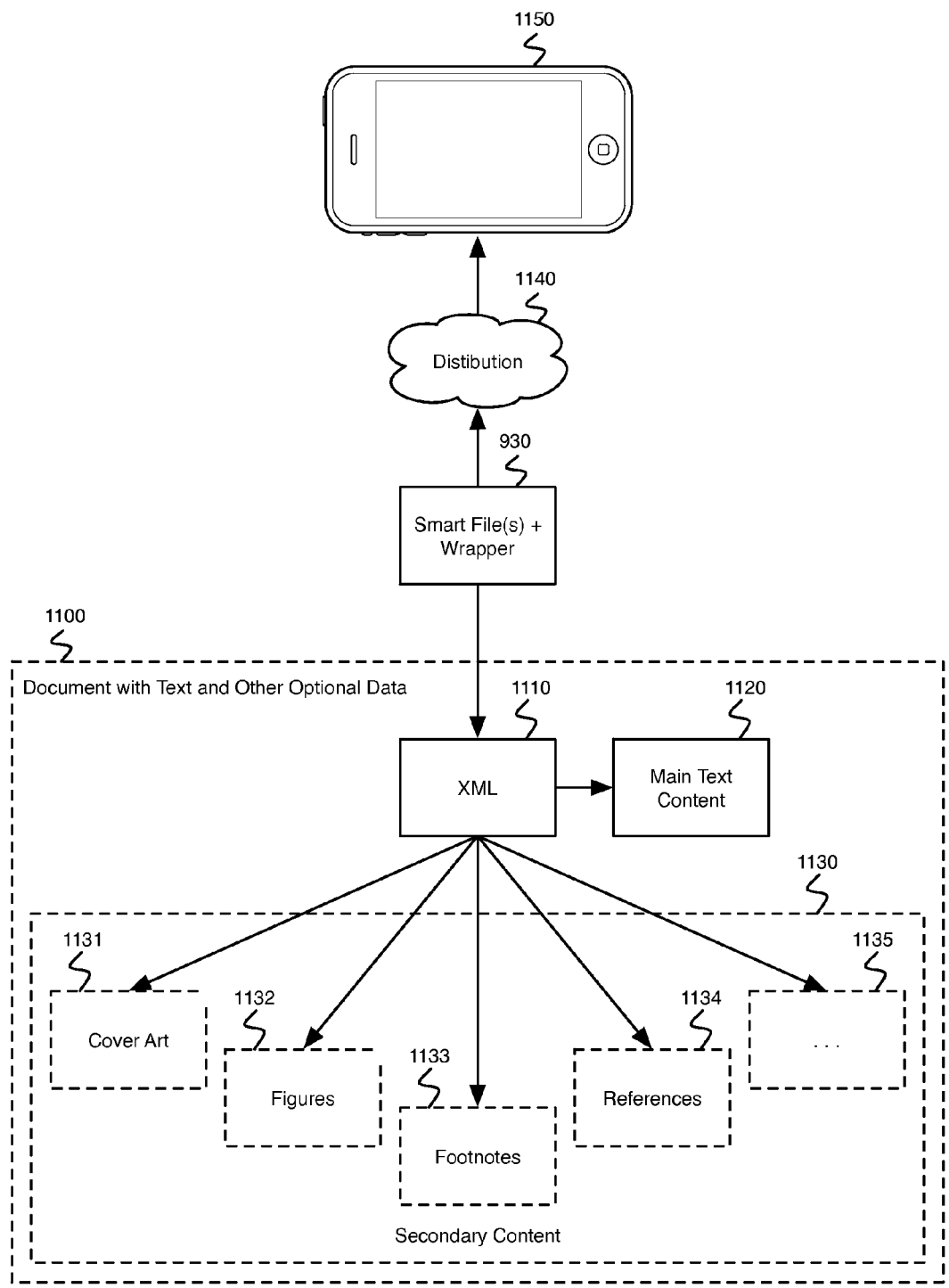
FIG. 11 is an embodiment of a smart document viewer that displays and navigates a single document with text and optional secondary data.

In one embodiment, a smart document viewer 930 (smart file plus wrapper) displays and navigates a single document such as a book. An illustration showing the structure of such a smart file (e.g., PDF) viewer that can display a single complex, document with multiple kinds of data content is shown in FIG. 11. In an embodiment, different data types such as body text, figures, and footnotes are placed as separate data types; order is still preserved within each data type, but data types are not mixed within the template itself. Instead, links from the body text to accessory data such as figures and footnotes are preserved so that secondary content data can be accessed from their correct reference location within the text, but are stored and accessed separately from the body text. In an embodiment, the application 1100 is composed of extensible markup language (XML) used to define and structure the data 1110, which includes the main text content 1120 (in a smart file 900) and other optional secondary content 1130. Secondary content includes cover art 1131, figures 1132, footnotes 1133, references 1134, and other media content 1135 such as table of contents, list of figures, graphs, drawings, photos, audio, videos, glossary, index, answers to questions etc. These optional data can be stored as individual data files (e.g., PNG or JPEG files for artwork; MP3 files for audio, etc.) or as additional smart documents (e.g., PDFs) with multiple pages.

This page-based means of linking content and navigating device-specific documents contrasts with web navigation, a text-based means of navigating reflowable text content. Thus the invention allows for hyperlinking of multiple data types or content, but unlike hypertext, in which reflowable text is the source to other text locations or files, in the present invention, hyperpaging is used to link content. A hyperpage is a static, non-reflowable page in a smart file that has been typeset for a specific device that is the source link to a destination such as a typeset page in another smart file or to some other supplementary content file. Thus, in this embodiment, the application provides user navigation control between source content in the smart file and destination content from the other secondary data content via page-centric linking that presents the destination content and returns to the source page of the smart file.

For example, pages 1, 2, and 3 each with 1 footnote, a, b, and c are placed in separate templates, one template for body text, and another template for footnotes. After conversion to the template all content is exported to separate smart files. All content is preserved; serial order of data is preserved, but data is stored and displayed is separate files or smart sub-documents, facilitating random access navigation. Links from page 1 of document 1 to page 1 of document 2 containing the content of footnote a, page 2 of document 1 to page 2 of document 2 containing of footnote b, etc. are preserved so that the body text correctly points to its respective linked data. This embodiment may be useful for typesetting for devices with limited display sizes and can facilitate legible and readable presentation of each data kind for a display. For example, figures, footnotes, endnotes, definitions of terms, references for citations, or other data are displayed for browsing and navigation separately from body text. Similarly, elements such as headers or footers that contain the title, name of the author, or page numbers can be displayed separately from the body text. In one embodiment, questions can be displayed in the main text document and answers to the questions in a secondary document. In another embodiment, a picture book can be displayed with text in a main text document and animated video corresponding to the picture can be displayed in a secondary document. In such an embodiment, the user could control a fully interactive book and read a book when desired or 'play' a video of the animated version of the book with moving pictures and/or audio of the text being read aloud. In this embodiment, the secondary content could be a video or audio file or multiple video or audio files.

In another embodiment, a smart document viewer 930 displays and navigates a library of multiple smart documents.

Figure 12:
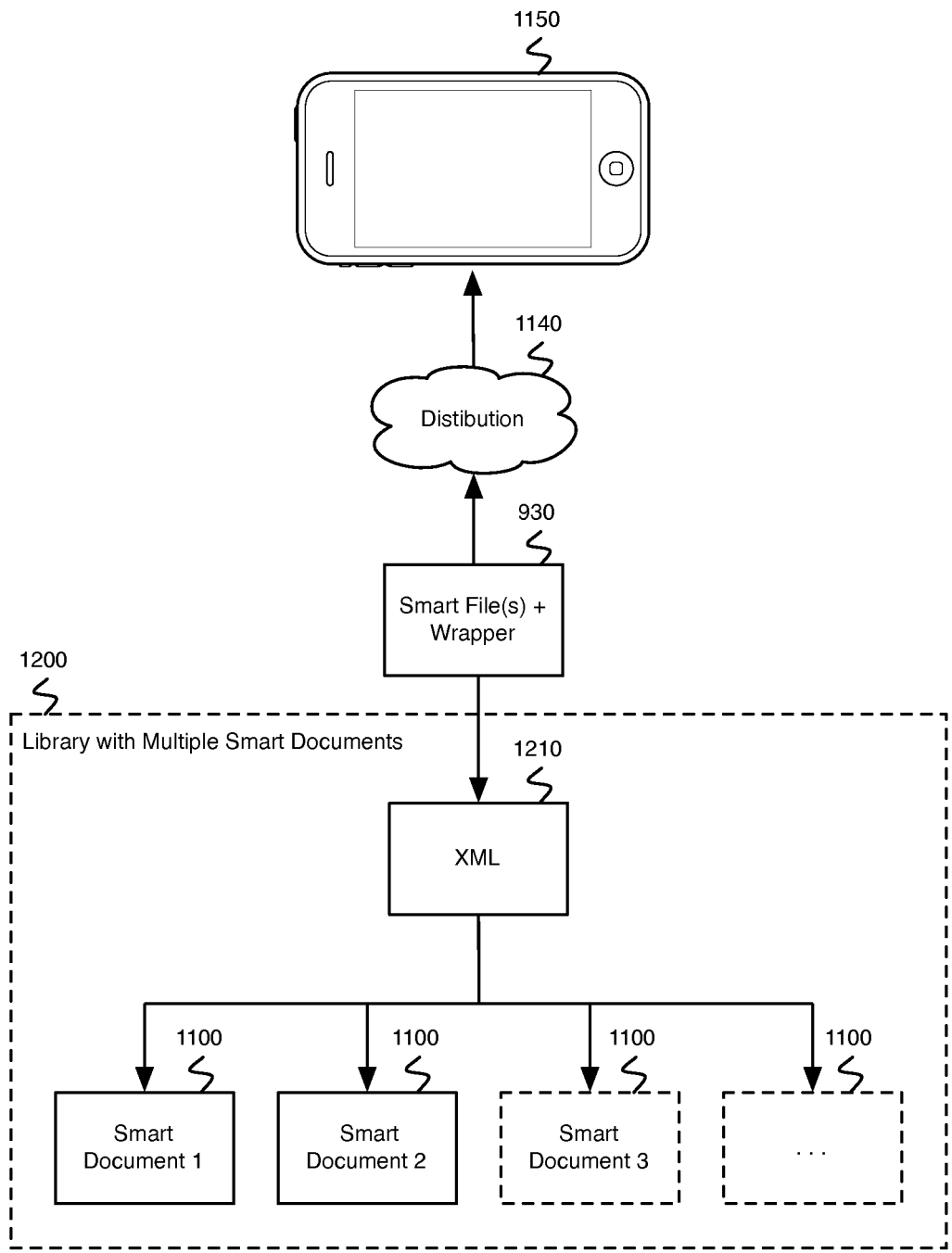
FIG. 12 is an embodiment of a smart document viewer that displays and navigates a library of multiple smart documents.

A chart showing how multiple smart documents 1100 are structured in a library application 1200 is shown in FIG. 12. Navigation control includes choosing which document to view; XML 1210 defines and structures the documents that can be accessed. In an embodiment, the selection of documents is fixed and can be distributed as a set, e.g., a series of books by the same author. In another embodiment, selection of books in a library is dynamic and new documents can be added or deleted from the library by the user. Navigation could allow browsing of documents by genre, topic, title, author, date of publication, date of purchase, or other criteria. In an embodiment, a library could contain documents of a book in multiple language translations.

From the point of view of the user of a device such as an iPhone®, the viewer application 930 (smart file(s) plus a wrapper), embodied either as a single smart file viewer 1100 or a multi-document smart file viewer 1200, is acquired through one of several distribution methods 1140 and stored on the device 1150. Distribution includes a device-specific distribution network such as Apple's iTunes Store®, App Store℠, iBooks Store™ for the iPhone®, iPod®, and iPad™ other networks over the web or other computer networks, or any other way of distributing a smart document viewer application 930 to a user-device. Once the application is distributed to the device 1150, the application can be opened (run) by the user (application executed by the device CPU) and the contents displayed on the device. In an embodiment, distribution may involve the user buying the viewer application 930 before it is transferred and stored to memory on the device 1150. In another embodiment, a multi-document viewer may be available via distribution for free, but the user may purchase individual smart documents through a distribution method, which are then stored to memory on the device. In an embodiment, a reading device comprises a display having a device-specific format, storage and a processor. A smart file in the storage contains text content and information about the appearance and position of the text content for the device-specific format. A device-specific application in the storage is configured to be run by the processor to display text content from the smart file on the display. The device-specific application is only operable with displays having the device-specific format and with smart files configured for the device-specific format. In an embodiment, the device-specific application is an iPod® or iPhone® App and the device-specific format is that of an iPod® or iPhone®. In another embodiment, the device-specific application is an iPad™ App and the device-specific format is that of an iPad™.

Figure 13:
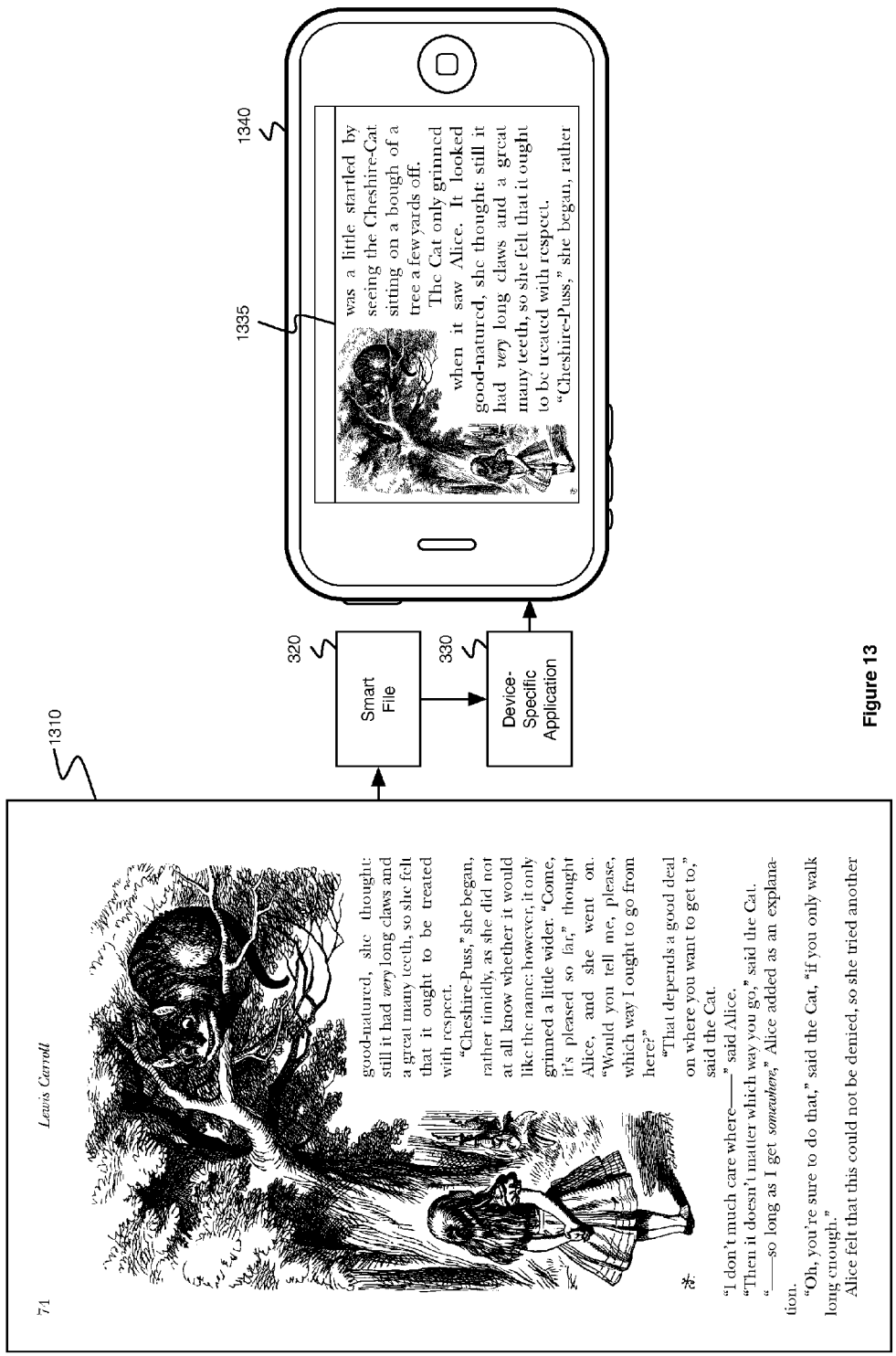
FIG. 13 is a diagram with an example of a page of a source document used for print publication and the rendering of a page on an iPhone® using a Smart File-Device-specific Application approach in accordance with the present invention.

FIG. 13 illustrates the use of a smart file and device-specific application approach in a second example in accordance with the present invention to produce electronic books from the binary application files used to create print books. A rendering 1310 of a desktop publishing binary file 420 is shown. The combination of a "smart file" 320 and "device-specific application" 330 produces a rendered result 1335 on a visual display device 1340 that is device-specific (e.g., the Apple iPhone®) and maintains the look and feel of the rendering 1310 of the binary application file used to make printed books because the metadata is maintained and adapted, but is never discarded.

Figure 14:
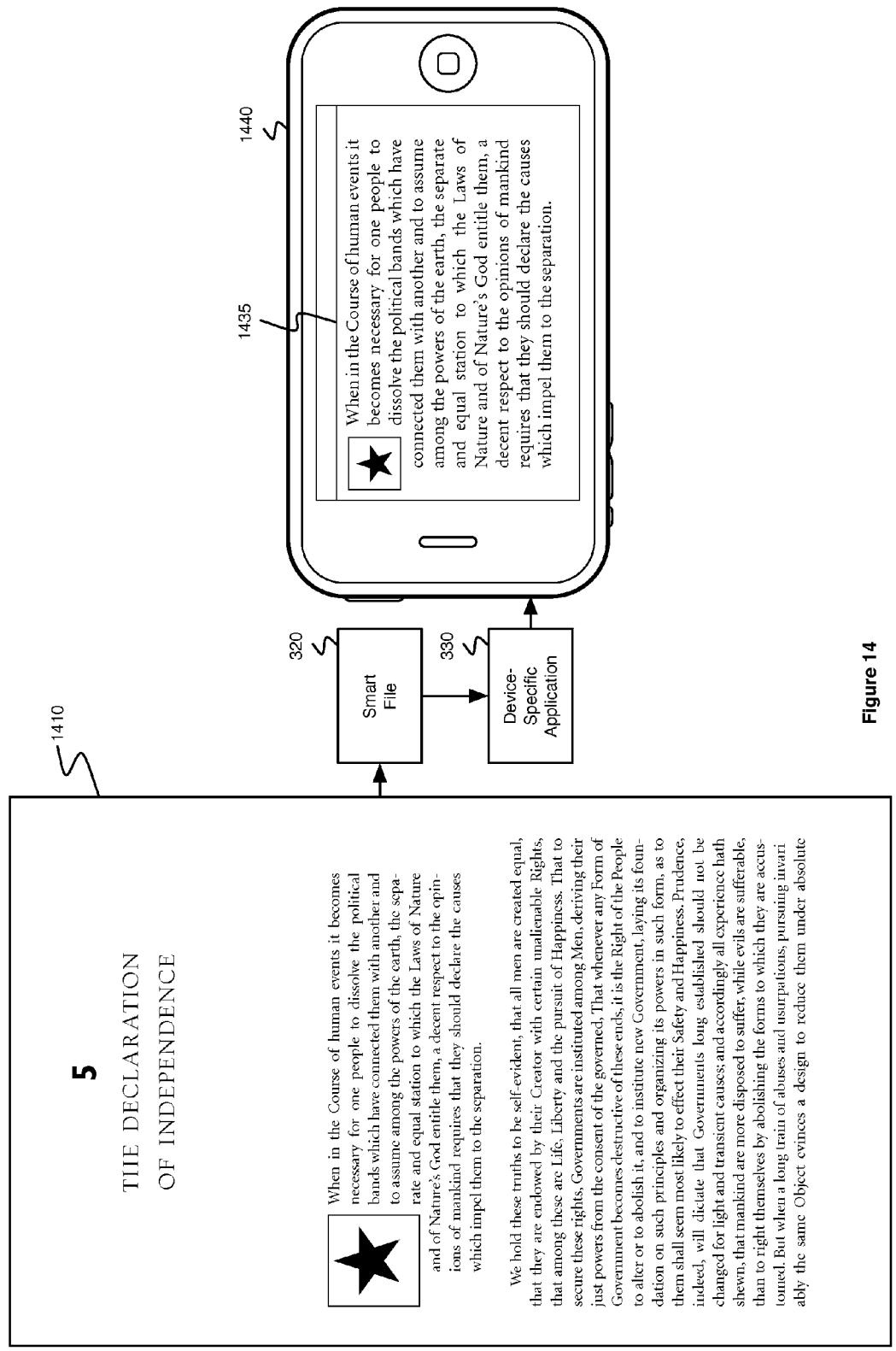
FIG. 14 is a diagram with another example of a page of a source document used for print publication and the rendering of a page on an iPhone® using a Smart File-Device-specific Application approach in accordance with the present invention.

FIG. 14 illustrates the use of a smart file and device-specific application approach in a third example in accordance with the present invention to produce electronic books from the binary application files used to create print books. A rendering 1410 of a desktop publishing binary file 420 is shown. The combination of a "smart file" 320 and "device-specific application" 330 produces a rendered result 1435 on a visual display device 1440 that is device-specific (e.g., the Apple iPhone®) and maintains the look and feel of the rendering 1310 of the binary application file used to make printed books because the metadata is maintained and adapted, but is never discarded.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A computer-implemented method embodied in a tangible medium for electronic publishing to a device, said method configured to execute the computer-implemented steps of:
   a) providing a display-specific binary file template that is only machine readable, said display-specific binary file template providing a static, fixed-layout page sized to match a fixed display size of the device and providing page layout and typographic settings including a body text size determined to be legible and readable on the fixed display size;
   b) using the page layout and typographic settings to arrange content including body and non-body text from one or more source documents in the binary file template including setting the body text to the determined body text size for the display-specific binary file template and using a ratio between a body text size of the source document and the body text size of the display-specific binary file template to set the non-body text of placed content to be legible and readable as static, fixed-layout pages in a static, and fixed-layout document, said static, fixed-layout document providing the exact arrangement and appearance of the content as it will be displayed on the device; and
   c) converting the static, fixed-layout document to an output file to fix the exact arrangement and appearance of the content, said output file containing a complete description of the static, fixed-layout document, including the body text, fonts, graphics, and information needed to display the document on the device.

2. The method of claim 1, wherein the one or more source documents are configured for print publishing.

3. The method of claim 1, wherein the one or more source documents are configured for electronic publishing.

4. The method of claim 1, wherein in step (a) providing typographic settings that produce legible and readable content is done within the display-specific binary file template using temporary content, said temporary content is deleted after typographic settings determination to create a blank binary-file template to be used for converting multiple source binary file documents.

5. The method of claim 1, wherein the display-specific binary file template includes a desktop publishing application display-specific binary file template, the display-specific binary file template configured to have page dimensions that match the device display or a sub-part of the device display that excludes user-interface controls or other informational content.

6. The method of claim 1, wherein in step (b) the order of all content in the one or more source documents is preserved when the content is placed into the display-specific binary file template.

7. The method of claim 1, wherein in step (b) the order of content in the one or more source document is preserved according to its data kind and different kinds are placed into different display-specific binary file template.

8. The method of claim 1, further comprising:
(d) pairing the output file with an application, said application configured to display the smart file as fixed-layout pages on the device display without computing the arrangement of content.

9. The method of claim 8, wherein in step (d) the application encapsulates the output file with all content contained within.

10. The method of claim 8, wherein in step (d) the output file is paired with the application at the device.

11. The method of claim 8, wherein in step (d) the output file is wrapped with the application for distribution.

12. The method of claim 11, wherein the application encapsulates the output file and encapsulates other secondary data content.

13. The method of claim 12, wherein the application provides user navigation control between source content in the output file and destination content from the other secondary data content via page-centric linking that presents the destination content and returns to the source page of the output file.

14. The method of claim 11, wherein the application encapsulates the output file and encapsulates other secondary data content in one or more different output files.

15. The method of claim 11, wherein multiple source documents are converted into multiple independent device display-specific output files, said application encapsulating a library of said multiple independent output files.

16. The method of claim 11, wherein the application provides user navigation control within the output file including one or more of the navigation functions selected from page forward, page backward, browse the table of contents, return to the most recently viewed page, a heads up display for fast, random access navigation, and browse optional secondary content.

17. The method of claim 11, wherein the output file predetermines the location and appearance of content, said application providing only the capability to navigate pages and bookmarks and to display a page correctly.

18. The method of claim 11, wherein the display-specific binary file template is configured to have a baseline grid or grid equivalent, margins, and line spacing that make text and other content displayed in the display-specific binary file template legible and readable.

19. The method of claim 11, further comprising distributing the application to a device for storage, navigation, and viewing of the output file.

20. The method of claim 19, wherein the device is a smart phone or tablet.

21. The method of claim 20, wherein the application and encapsulated device-specific output file are distributed via an Internet based store.

22. A system for electronic publishing to a device, comprising:
a display-specific binary file template that is only machine readable, said template providing a static, fixed-layout page sized to match a fixed display size of the device;
page layout and typographic settings including a body text size determined legible and readable on the fixed display size; and
one or more computer processors configured to:
use the page layout and typographic settings to arrange content including body and non-body text from one or more source documents in the display-specific binary file template including setting the body text to the determined body text size for the display-specific binary file template and using a ratio between a body text size of the source document and the body text size of the display-specific binary file template to set the non-body text of placed content to be legible and readable as static, fixed-layout pages in a static, fixed-layout document, said static, fixed-layout document providing the exact arrangement and appearance of the content as it will be displayed on the device; and
convert the static, fixed-layout document to an output file to fix the exact arrangement and appearance of the content, said output file containing a complete description of the static, and fixed-layout document, including the text, fonts, graphics, and information needed to display the document on the device.

23. A computer program product for facilitating electronic publishing of static, fixed-layout documents to a device, the computer program product comprising a non-transitory computer-readable storage medium having computer-readable program code portions stored therein, the computer-readable program code portions comprising:
a first executable portion configured to provide a display-specific binary file template that is only machine readable, said template providing a static, and fixed-layout page sized to match a fixed display size of the device;
a second executable portion configured to provide page layout and typographic settings including a body text size determined to be legible and readable on the fixed display size;
a third executable portion configured to use the page layout and typographic settings to place and arrange content including body and non-body text from one or more source documents in the display-specific binary file template including using a ratio between a body text size of the one or more source document and the body text size of the display-specific binary file template to convert the body text and non-body text of placed content to be legible and readable as static, fixed-layout pages in a static, fixed-layout document, said static, and fixed-layout document providing the exact arrangement and appearance of the content as it will be displayed on the device; and
a fourth executable portion configured to convert the static, and fixed-layout document to an output file to fix the exact arrangement and appearance of the content, said output file containing a complete description of the static, and fixed-layout document, including the text, fonts, graphics, and information needed to display the document on the device.

24. A computer-implemented method embodied in a tangible medium for electronic publishing to a device, said method configured to execute the computer-implemented steps of:
a) configuring a display-specific binary file template that is only machine readable by matching the size of a static, and fixed-layout page to a fixed display size of the device and placing temporary content in the template, determining page layout and typographic settings that are legible and readable, and deleting the temporary content;
b) using the page layout and typographic settings to place and arrange content from one or more source documents in the binary file template to be legible and readable as static, fixed-layout pages in a static, fixed-layout document, said static, and fixed-layout document providing the exact arrangement and appearance of the content as it will be displayed on the device; and
c) converting the static, fixed-layout document to an output file to fix the exact arrangement and appearance of the content, said output file containing a complete description of the static, and fixed-layout document, including the text, fonts, graphics, and information needed to display the document on the device.

25. A method of distributing electronically published documents to users of display devices, comprising:

storing a library of electronically published one or more document, each said electronically published document stored as a device display-specific binary file template for at least one type of display device having a fixed display size, said the device display-specific file template having a format that fixes the exact arrangement and appearance of content of a static, and fixed-layout document having pages sized to match the fixed display size, said file format containing a complete description of the static, and fixed-layout document, including the text, fonts, graphics, and information needed to display each page of the one or more document to be legible and readable on the fixed display size of the display device;

selling an electronically published of the one or more document to a user of a particular display device; and distributing the device display-specific file template for that electronically published the one or more document for the particular display device to the user.

26. The method of claim 25, wherein the library is stored and the device display-specific files template are distributed via a network of computers and said display devices are smart phones or tablets.

* * * * *